INVENTORS
Curzon Dobell
Leslie P. Wilson

INVENTORS
Curzon Dobell
Leslie P. Wilson

BY Stevens, Davis, Miller & Mosher
ATTORNEYS

United States Patent Office 3,425,118
Patented Feb. 4, 1969

3,425,118
APPARATUS AND METHOD OF MAKING ELONGATED VESSELS, CONTAINERS AND TUBULAR MEMBERS
Curzon Dobell, Nassau, Bahamas, and Leslie P. Wilson, London, England; said Dobell assignor to Caribbean Holdings Ltd., Nassau, Bahamas, a Bahamian corporation
Filed Jan. 24, 1964, Ser. No. 341,835
U.S. Cl. 29—477.3      30 Claims
Int. Cl. B23k *31/06;* B21d *51/04*

The present invention relates to apparatus for making elongated pressure vessels or conduits from a length of high strength material of any cross section which is wound or wrapped on a forming head, which head may be a rotating or fixed head.

The present invention further relates to apparatus for making elongated vessels, containers and tubular members and a method for making them, and more particularly to the manufacture of elongated members wherein a continuous piece of metal ribbon or steel strip material may be helically wound or wrapped upon a forming head with successive turns or loops of the materials joined or secured together to form the elongated container, tube, tank, or pressure vessel and the like.

It is an object of the present invention to provide an elongated member formed of a plurality of individual wound turns of steel strip material or ribbon wound from a length of high strength material with adjacent or successive turns of the ribbon bonded together and in which the elongated member is formed on a relatively short forming head which is positioned at the point where the wrapping is being applied thereto, and in which the growing elongated member does not require the usual conventional mandrel used heretofore on which the individual turns of ribbon material are wound and secured together after which the conventional mandrel is collapsed and removed from within the center of the completed elongated member.

It is another object of the present invention to provide a method of making a pressure cylindrical wall by helically wrapping a high strength ribbon or steel strip material in overlapping relation one turn over the immediately preceding turn and securing the overlapping turns of the ribbon together, which winding is accomplished on a rotatable axially fixed forming head which supports the helical turns or wrapping only at the point where the wrapping is being applied to the head in order to secure successive turns together, and in which the secured turns or the completed turns of the elongated member being formed are axially advanced from or off of the head, and the successive turns or coils of the ribbon material are progressively wrapped around the head and secured to one another to provide the desired length of the elongated member.

It is another object of the present invention to provide an apparatus and method for forming an elongated cylindrical member from a continuous strip or ribbon of steel material that is helically wound upon a short forming head, and successive adjacent turns of the ribbon material are bonded or secured to each other on the head, after which the growing cylinder is withdrawn from the head, and which head eliminates the full size mandrel used heretofore wherein the individual turns of ribbon material were disposed on an elongated mandrel, and after they were all secured together and the cylindrical member completed, the mandrel was thereafter collapsed and removed from within the turns of wire.

It is another object of the present invention to provide an apparatus and method for forming a pressure vessel or conduit wherein a length of high strength material is wound upon a rotatable forming head which is axially fixed, and means are provided for applying an axial force to the completed turns of the growing conduit so that the conduit can be withdrawn from or advanced axially from the head and successive turns of material can be positioned on the head so as to be joined together.

It is another object of the present invention to provide an apparatus and method for manufacturing an elongated cylindrical member from a plurality of individual loops or turns a strip material utilizing a forming head provided with axial friction reducing means to facilitate removal of a completed cylindrical member from the wrapping head.

It is another object of the present invention to provide an apparatus for forming a cylindrical member made up of a plurality of turns or coils or ribbon material formed from a continuous piece of steel material and a conical winding head freely rotatable with means for rotating and axially moving the completed portion of the cylinder from the conical winding head.

It is another object of the present invention to provide a freely rotatable head for winding a plurality of turns helically thereupon from a length of material for forming a cylindrical member provided with friction means for removing the completed turns of the cylinder from the head including belt means rotating axially and carried on barrel shape roller bearing means.

It is another object of the present invention to provide an apparatus and method for fabricating a cylindrical member from a plurality of individual helically wound turns of high strength material by wrapping the material upon a forming head and in which end closures or closure members can be provided in the completed cylinder by utilizing one of the closure members as the winding head upon which the turns of the material are wrapped so that a complete closed cylindrical member can be formed in a single operation.

It is another object of the present invention to provide an apparatus and method for forming a vessel by helically winding a plurality of individual turns of strip material on a wrapping head on which they are secured to one another and in which the fabricating apparatus can be moved in an axial direction while the pressure vessel remains stationary or static with respect to axial movement.

It is another object of the present invention to provide an apparatus for forming a pressure conduit by winding a plurality of individual turns of high strength material on a head and securing successive turns to one another in a butt joint relationship, and forming end closure members for the pressure conduit to provide a closed chamber or vessel.

It is another object of the present invention to provide apparatus for forming a pressure vessel by wrapping individual turns of wire upon a forming head and securing successive turns to each other in a butt joint relationship and axially advancing secured turns off the head.

It is another object of the present invention to provide an apparatus and method for manufacturing an elongated tubular conduit or casing by helically wrapping individual turns of a strip of material upon a wrapping head and in which the tubular conduit can be fabricated on site where it is to be used and formed in a vertical or horizontal direction.

It is another object of the present invention to provide an apparatus for forming an elongated cylindrical member wherein the production machinery rotates and advances around the cylindrical structure that is being formed and the cylindrical structure remains in a static position after fabrication.

It is another object of the present invention to provide an apparatus and method for the fabrication of a pipe or tubular member and the like from a helically wound continuous strip of ribbon material in which the adjacent turns of the ribbon are secured to one another to form a lengthening tubular conduit in which the production machinery can be moved axially of the extending length of the tubular conduit so that the tubular conduit may be manufactured and immediately positioned within a trench or the like.

It is another object of the present invention to provide an apparatus for forming a pressure vessel from a length of high strength material by wrapping the material in successive turns around a forming head which finished product may have various cross sections and does not necessarily have to be cylindrical.

Various other objects and advantages of the present invention will be readily apparent from the following detailed description when considered in connection with the accompanying drawings forming a part thereof.

Figures 1, 6:
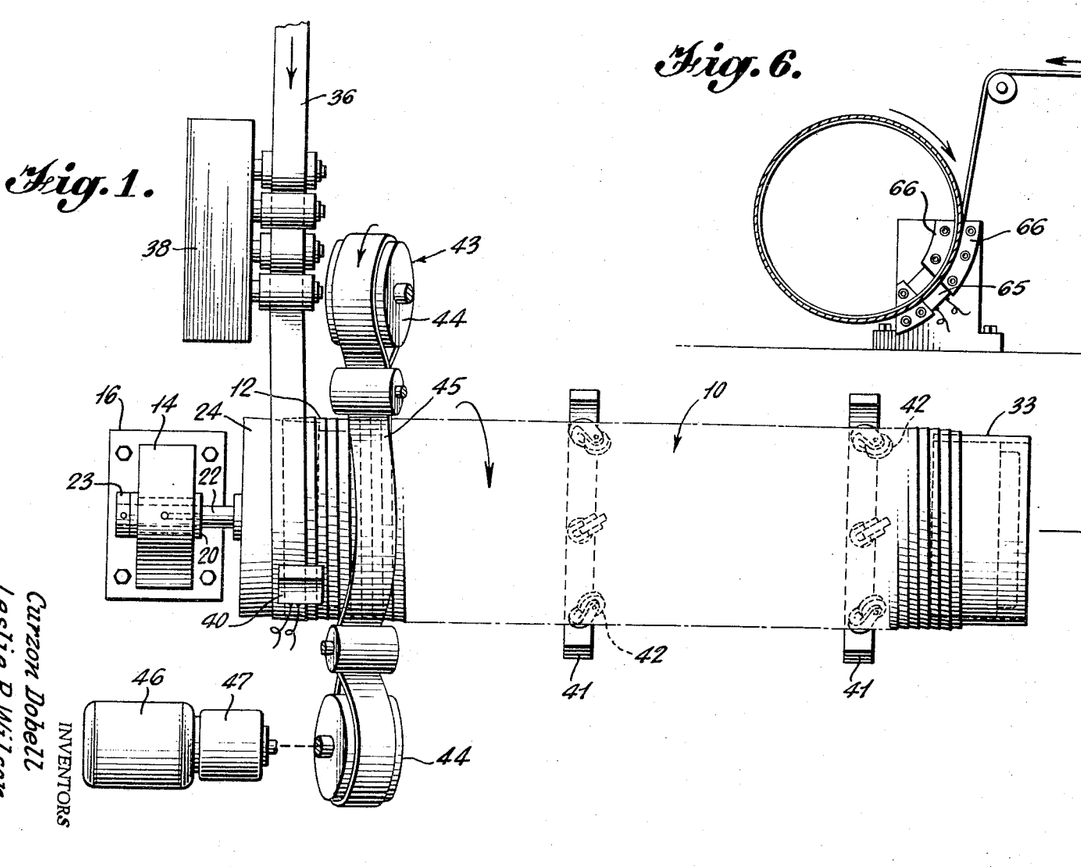
FIG. 1 is a plan view of an apparatus embodying the present invention illustrating a rotatable forming head and belt drive means for imparting a rotational and axial movement to the completed portion of the cylindrical member to remove it from the forming head.
FIG. 6 is a section taken on line 6—6 of FIG. 5 illustrating a partial perimeter forming head and induction heating means for securing one turn of the ribbon to the next successive turn as they are wrapped upon the partial head.
Figure 2:
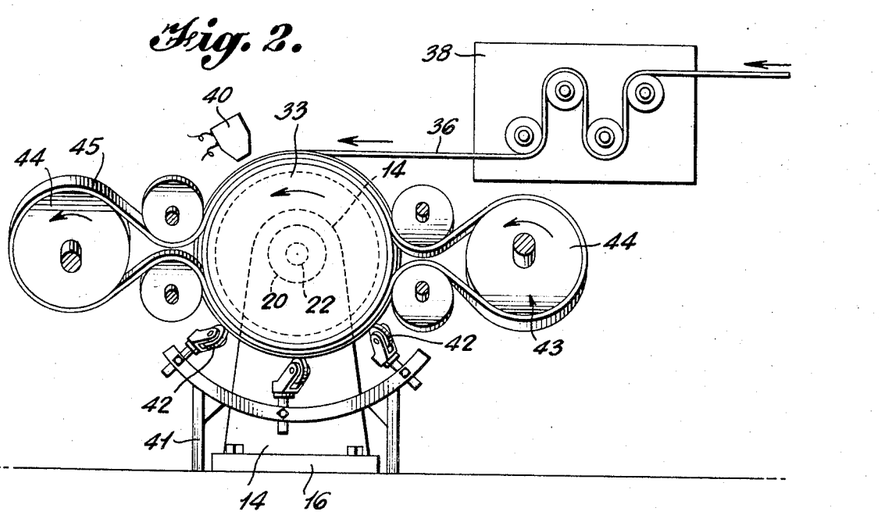
FIG. 2 is an end view of the apparatus of FIG. 1 for fabricating the cylindrical member illustrating the structure for supporting the finished portion of the cylindrical member as it is moved axially of the wrapping mandrel.
Figure 3:
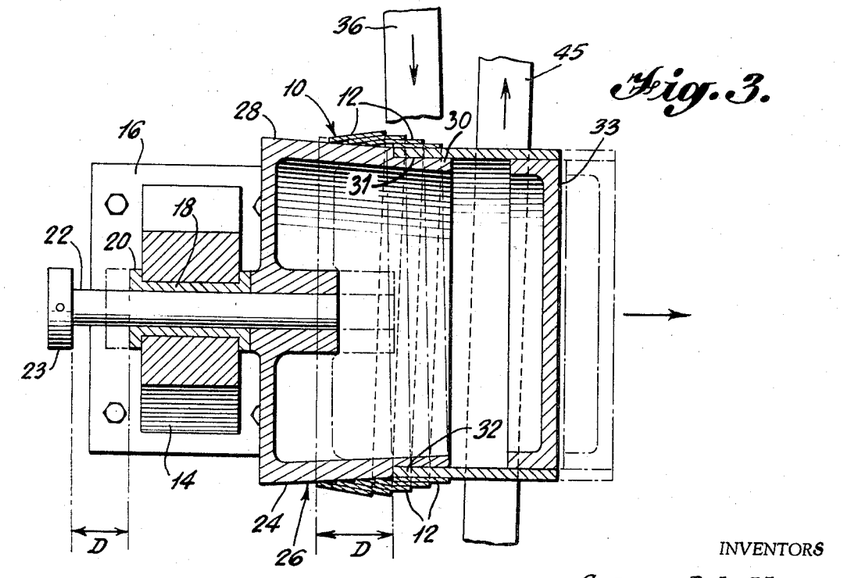
FIG. 3 is a detail view of the forming head and skirt shown in FIG. 1 illustrating the wrapping and securing of the turns of the continuous strip material on the skirt.

Referring to the embodiment of the invention shown in FIGS. 1 to 3, the reference in numeral 10 generally designates an elongated cylindrical member, tube or container formed from a plurality of individual turns or coils 12 of flat ribbon, steel strip material, glass filaments, or plastic material secured together in a butt joint relationship, or secured together in an overlapping relationship with one turn of material overlapping the next adjacent turn of material.

The apparatus for forming the cylindrical member is provided with a vertical support arm or member 14 secured to a base or foundation 16. The upper end of the support arm 14 is provided with a horizontal bore 18 extending therethrough in which is disposed a fixed sleeve bearing 20. A stub shaft or horizontal axle 22 is journalled in the bearing 20 and is provided with a stop collar 23 on one end thereof. A substantially conical forming head 24 is fixed to the axle 22 for rotation with the axle so that the head is freely rotatable with respect to the fixed arm 14. The head 24 is provided with a conical surface 26 having the portion 28 thereof adjacent the fixed arm member 14 of substantially greater diameter than the outer portion 30 thereof. The portion 30 of the forming head is provided with a circumferential shoulder 31 thereon adapted to receive the mating end 32 of a false skirt member or closure member 33.

The leading edge of a continuous steel ribbon 36 is fed or advanced through a strip tensioning and pre-stressing device 38 onto the rear or rearward edge portion 32 of the false cylindrical skirt member 33.

The purpose of the axial movement in the apparatus is to permit the turns 12 of the steel ribbon material 36 to be wound on the closure head 33 for a distance equal to D as indicated in FIG. 2 to provide the required area of bonding between the closure skirt or head 33 and the wrapped cylinder to prevent blowing off the closure head when the complete structure is subjected to internal pressure. The leading edge of the steel ribbon 36 is bonded to the false skirt or head member 33 and the false skirt member and the forming head are rotated, and permitted to move axially so that the wrapping is bonded on the closure skirt for a distance equal to D. The axial movement of the forming head is stopped by the collar 23 moving to the position indicated in dotted lines. Once this axial movement is completed the wrapping then proceeds on the conical forming head 26 from which the wrapping slips off axially as the head is restrained from further axial movement. The individual turns or coils 12 of the ribbon 36 are never bonded to any portion of the forming head 26, but each turn of the ribbon is bonded or secured to the succeeding or next turn of the ribbon there adjacent.

Referring to FIG. 3 the ribbon 36 is illustrated as wound around and overlapping the preceding turn of the ribbon, or in other words each succeeding or successive coil of ribbon overlapping the preceding turn already wrapped around the forming head. However, it is to be realized that the apparatus of the invention also covers the securing of the individual turns of ribbon together in a butt joint relationship. The turns of the ribbon are bonded to each other by a well known induction heater 40, not forming part of the invention. Heater 40, as is well known, produces rapid heating which can be applied for melting a brazing alloy or tack welding. If desired the turns can be bonded by any standard method of brazing or welding or the use of adhesive material such as epoxies.

The formed portion of the cylindrical member and the axially movable closure head 33 are supported as the cylindrical member grows by a plurality of frame members 41 provided with roller members 42 as shown in FIGS. 1 and 2. The frames 41 are disposed in longitudinal alignment with the cylindrical member in the direction of growth and of course one frame 41 is disposed directly beneath the point of initially winding the metal ribbon 36 upon the false skirt when it is in the position shown in FIG. 3. The rollers 42 are disposed at an angled position so as to offer the least amount of frictional resistance to the continuous rotation of the cylindrical member and axial movement thereof.

The skirt member 33 and the formed cylindrical member is moved axially of the forming head 24 by drive means generally indicated as 43 in FIGS. 1 and 2. The drive means 43 consists of two spaced rollers 44 upon which is carried an endless twisted belt 45. The rollers 44 are journalled on support members not shown and are driven by a motor 46 and a reduction gear unit 47 connected to one of the rollers. The rollers are disposed at an angle with respect to one another, as seen in FIGS. 1 and 2 so that the inclined roller axis causes the belt 45 to be twisted and have an inclined axis of rotation with respect to the false skirt member 33 and the cylindrical member 10 to impart a longitudinal or axial force as well as a rotational force to the false skirt and the completed cylindrical member to pull the completed cylindrical member and the false skirt in an axial direction away from the forming head 24. Thus, as the continuous material is wound around the forming head and successive turns of the ribbon are bonded or brazed to one another, the frictional force of the ribbon on the forming head is overcome by the pulley belt means on the completed portion of the cylindrical member to progressively advance or draw it from the forming head.

It is not essential to have a false skirt or closure head 33 in every instance. A longer wrapping head 26 could be used so that there would be enough room at the forward end of the starting head on which the drive belt could ride without interfering with the wrapping and bonding operations following behind. However, if the starting head is short it is convenient to provide the false skirt 33 on which the drive belt can ride until the fabricated tube has passed beyond the forward end of the belt. After that the belt will ride on the fabricated tube. At this point the false skirt, which is just a convenience, has served its purpose and can be removed. In this use of a false skirt it is obvious that the wraps must not be bonded to the skirt.

Figure 11:
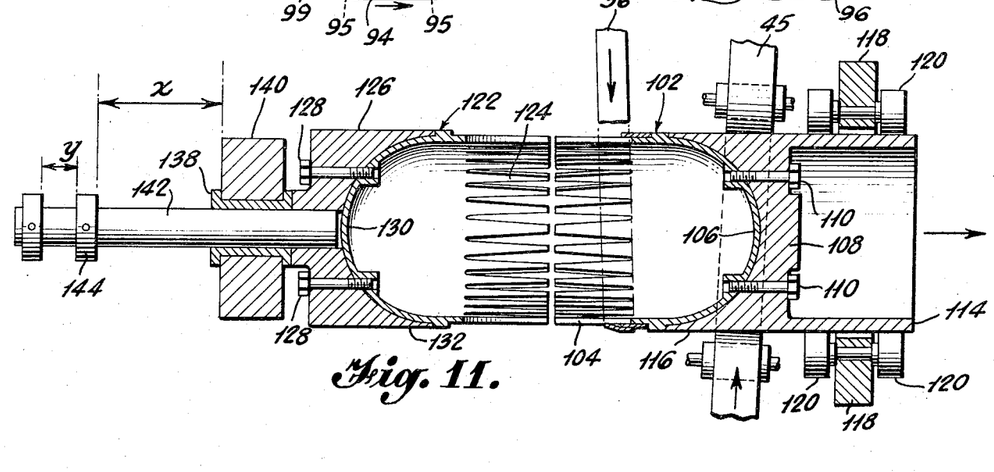
FIG. 11 is a plan view illustrating forming the cylindrical member of the present invention wherein end closures are provided so that a closed container can be manufactured in a continuous single step operation.

For a closed vessel there is a great advantage to using a permanent skirt, with an end plate, to which the wraps would be bonded to form a permanent end closure. Such a permanent end closure can be of any desired shape flat, conical, hemispherical, as shown in FIG. 11.

Figure 4:
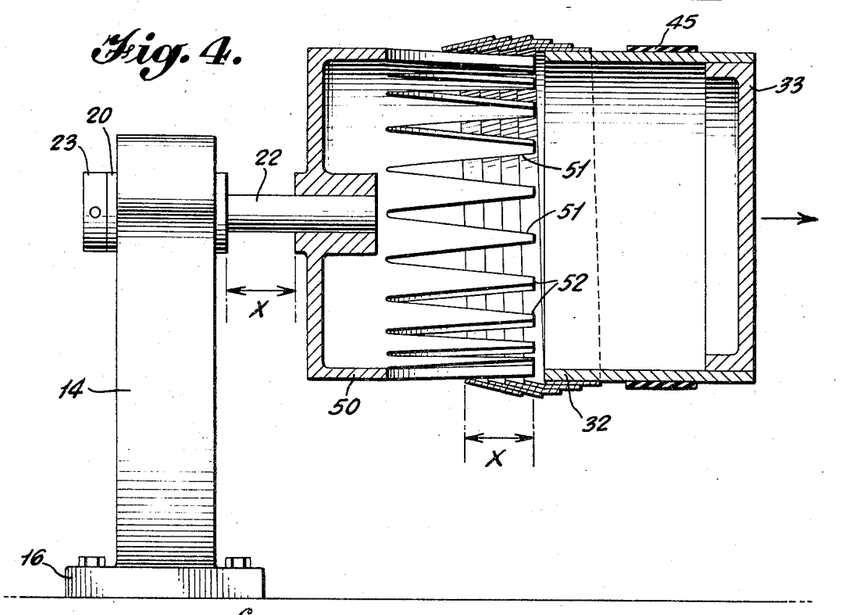
FIG. 4 is a view similar to FIG. 3 but illustrating a modified wrapping head utilizing a plurality of V-slots therein for permitting the head to bend inwardly to adapt to the slope of the strip material wrapped thereon.

Referring to the embodiment of the invention shown in FIG. 4, this is substantially the same as that already described with respect to FIGS. 1, 2 and 3, except that the forming head 50 is provided with a plurality of the slots 51 spaced in the peripheral portion of the head adjacent the end upon which the turns or coils of the ribbon are wound so that the forming head can adapt to the slope of the winding turns or coils. In initially winding the ribbon upon the false skirt 33 the edge portion 32 thereof is mounted or disposed over the fingers 52 of the head forming the slots. The false skirt 33 and the head 50 both move together an axial distance equivalent to X indicated in FIG. 4, just as in the operation already described in connection with FIGS. 1–3. The same twisted belt 45 is utilized in this embodiment of the invention for rotating and giving an axial movement to the completed cylindrical member and the false skirt. The initial turns of the ribbon are also bonded to the false skirt as already described in connection with FIGS. 1–3.

Figure 5:
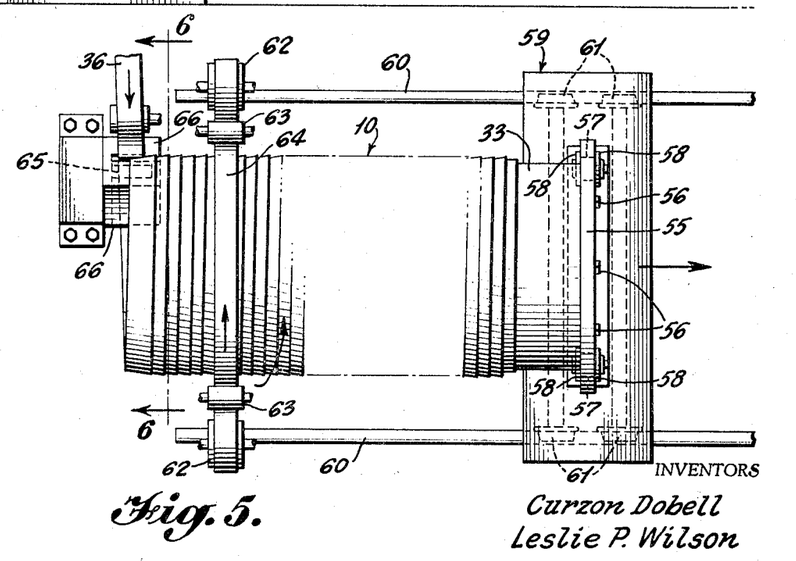
FIG. 5 is a plan view of a modified apparatus of the present invention.

Referring to the embodiment of the invention shown in FIGS. 5 and 6, the false skirt 33 has secured thereto a larger flat plate 55 by bolt members 56. The plate 55 rides in a series of circumferentially spaced axially rotated rollers 57 to prevent lateral movements. Laterally rotatable rollers 58 are disposed on both sides of the plate to permit controlled axial movement. All of these rollers in turn are supported on a carriage 59 which in turn is supported on a track or rail 60 by wheels 61.

This is driven by an electric motor or the like so as to pull the false skirt 33 and the formed portion of the cylindrical member in an axial direction as indicated by the arrow in FIG. 5, away from the point at which the metal ribbon 36 is being fed onto the apparatus. In this embodiment of the invention the end closure or false skirt 33 and the cylinder attached thereto are all free to rotate by the rotating force applied through the belt drive 64. The belt drive 64 is disposed on idler rollers 63 and enlarged rollers 62, equivalent to the rollers 44 already described, except that it will be noted the belt drive is not twisted or tilted to give an axial component, as the axial movement is provided by the power driven wheels 61. This embodiment of the invention is provided with an induction heater 65 and arcuate segments 66 providing a supporting or forming shoe or partial perimeter forming head.

It is not essential that the ribbon material be in contact with the entire periphery of the forming head in order to make a tubular shape. This illustrates a forming head for cylindrical bodies which need be in contact with the wrapping material for only a portion of the circumference as indicated by the arcuate segments 66. The segments would have to be of a sufficient length that the abutting or overlapping portions of adjoining wraps are fully bonded before they emerge. Thinking of a sequential series of wraps X, Y, Z, the first wrap X is wrapped around the false skirt 33 to obtain the true circumference; the second wrap Y being bonded to X during its passage through the arcuate segments would therefore follow the circumferential shape of X even though Y may not be in contact with the false skirt; likewise Z being bonded to Y will adapt to the shape of Y, and so on.

Figure 7:
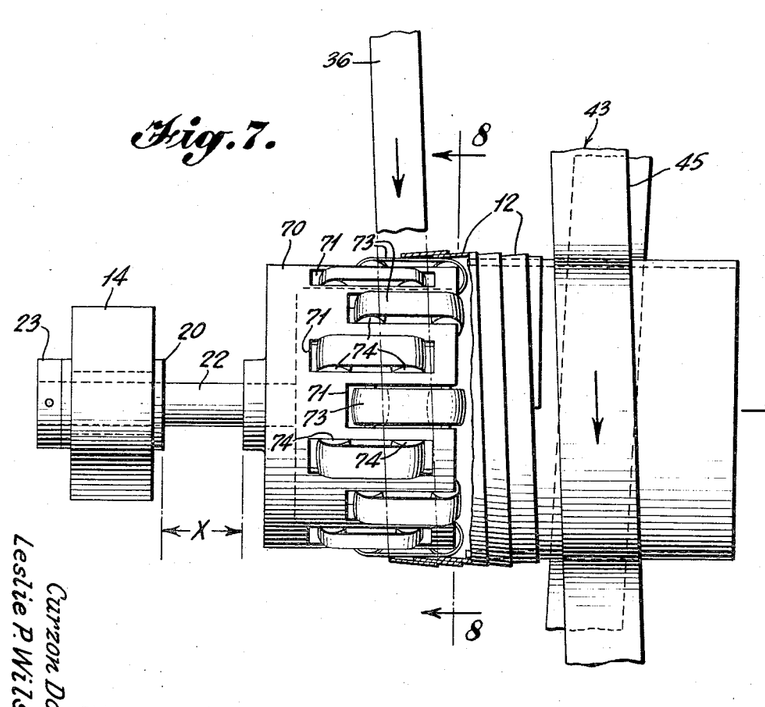
FIG. 7 is a view illustrating a modified rotatably driven forming head mandrel provided with axially disposed rollers and conveyors and means for pulling or advancing the bonded turns of the ribbon material from the head.
Figure 8:
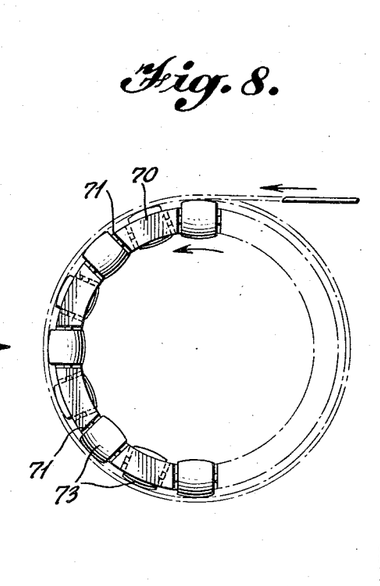
FIG. 8 is a view taken along line 8—8 of FIG. 7.

In the embodiment of the invention shown in FIGS. 7 and 8 the forming head 70 is freely rotatable. The head 70 is provided with a plurality of axially extending slots 71 circumferentially spaced around the head. Each slot is provided with axially positioned conveyor belts 73 disposed on rollers 74 carried by the head 70. The conveyor belts 73 are freely rotatable in an axial direction. The formed cylindrical member is removed from the head 70 by the false skirt member 33 to which the initial turns of the strip material 36 are secured. The rollers and conveyors therefore move in response to the axial movement applied to the false skirt member 33 by means already described herein.

Figure 9:
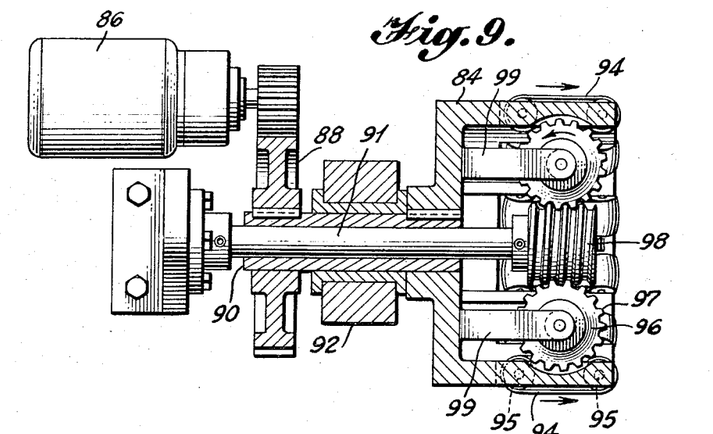
FIG. 9 is a view illustrating another type of forming head free to rotate and with a plurality of axially disposed rollers and conveyors for advancing the bonded turns of ribbon material off the head.
Figure 10:
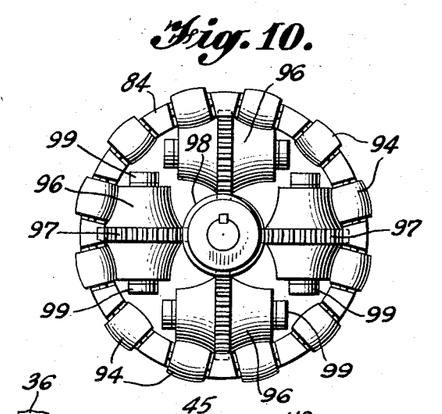
FIG. 10 is an end view of FIG. 9, from the right end.

The embodiment of the invention shown in FIGS. 9 and 10 is provided with a cylindrical forming head 84 that is positively driven by the motor 86 connected thereto by a drive gear wheel 88 keyed to a sleeve shaft 90 which in turn is keyed to the head 84. Sleeve shaft 90 is journalled in a fixed bearing 92 to prevent axial movement of the forming head. The head is also provided with a plurality of circumferentially spaced axially positioned conveyor belts 94 for imparting axial movement to the completed portion of the cylindrical member formed on the head.

The conveyor belts 94 are disposed in longitudinal slots provided in the head 84. Each conveyor belt 94 is carried by a pair of rollers 95 carried by the head. The conveyors 94 are driven in an axial direction as indicated by the arrows in FIG. 9 by friction drums 96. Each drum 96 is provided with a gear wheel 97 which meshes with and is rotated by a worm 98 fixed to a drive shaft 99 extending through the sleeve shaft 90. The drums 96 are carried on a pair of braces 99 disposed within the forming head 84. The shaft 99 and worm 98 are driven by a motor or any other conventional means not shown for purposes of clarity. In this embodiment of the invention no false skirt member is necessary since the forming head is a power driven head and supplies rotational and axial movement for removing the formed portion of the cylindrical member from the forming head.

Referring to the embodiment of the invention shown in FIG. 11, this modification of the invention provides the formation of a cylindrical member from a continuous strip of ribbon material in which end closures or closure members can be provided for the opposite ends of the cylindrical member simultaneously with the forming of the cylindrical member so that a complete closed container or conduit is formed in a continuous production or single step operation. This modification of the invention also provides the formation of the cylindrical member without the use of other types of forming heads, as in the previous embodiments described heretofore, since the cylindrical member is formed by wrapping the continuous ribbon upon a forming head that becomes an integral part of the finished product and one of the closure members.

Referring to FIG. 11, a winding head 102, which serves as a front closure member for the completed cylindrical member, is provided. The winding head 102 has a cylindrical portion 104 provided with a plurality of V-slots extending axially thereof and a convex or hemispherical portion 106. The forming or winding head 102 is secured to a chuck member 108 by screws 110 extending through the chuck member and threaded into corresponding threaded bores 112 in the convex portion of 102. The chuck member 108 is also provided with a cylindrical portion 114 oppositely disposed thereon from a concave portion 116 adapted to receive the convex portion of the head 102.

A fixed roller ring 118 having a plurality of rollers 120 journalled therein is provided for supporting the chuck member and the portion of the formed cylindrical member as it is moved axially from the ribbon strip tensioning and prestressing device. This embodiment of the invention is also provided with the inclined or twisted belt drive means 44 and 45 already described in connection with FIG. 1 which imparts a longitudinal frictional force to the chuck member 108 and the helical winding formed on the winding head 102 as the fabrication of the cylindrical member progresses. The metal ribbon has its initial turn wrapped on the wrapping head 102 inwardly of the V-slots therein with successive turns being wrapped around the V-slots. The turns of the ribbon are bonded or secured together on the winding head 102, as hereinbefore described and the inclined belt drive causes the winding head 102 and the chuck member and the portions of the ribbon formed on the head to be moved axially of the prestressing device to the right as indicated by the arrow in FIG. 11.

This embodiment of the invention is provided with another slotted forming head 122 substantially identical to the winding head 102 with a plurality of V-slots 124 therein disposed adjacent the slots in the head 102. The head 122 is secured to a chuck member 126, similar to chuck member 108, by screws 128 with the convex portion 130 of the head 122 being disposed in a corresponding concave portion 132 formed in the chuck member.

The chuck 126 is journalled in a sleeve bearing 138 of a fixed bearing support member 140. The shaft 142 fixedly connected to the chuck 126 is provided with two removable stop collars 144 and 146. The stop collar 144 permits the shaft 142 to move an axial distance indicated by X in FIG. 11, so that the turns 12 of the helical ribbon may be formed on the forming head 122 adjacent the V-slots 124.

As the winding progresses on end closure 102, end closure head 122 is moved up axially a distance by X by manual operation or means so that when the strip moves off 104, it immediately winds on end closure skirt 124. Winding will progress on 124, until stop collar 144 hits fixed bearing 140, when end closure 120 will remain stationary and proceed to act as a forming head, allowing the cylinder to grow a desired length. When the desired length is reached, the end closure 122 will advance the distance Y which will complete winding on end closure 122. Thus the winding head 122 has its slots 124 completely covered with the individual turns of the ribbon and a completed cylindrical conduit or member with the opposite ends closed by closure members consisting of the original slotted forming heads 102 and 122 is provided. Brazing or bonding material is disposed on and between the V-slots in each of the closure members or heads 102 and 122, respectively, to bond the closures and cylindrical portion to each other and the finished product forms an integral completed unit in a simple continuous production operation.

Figure 12:
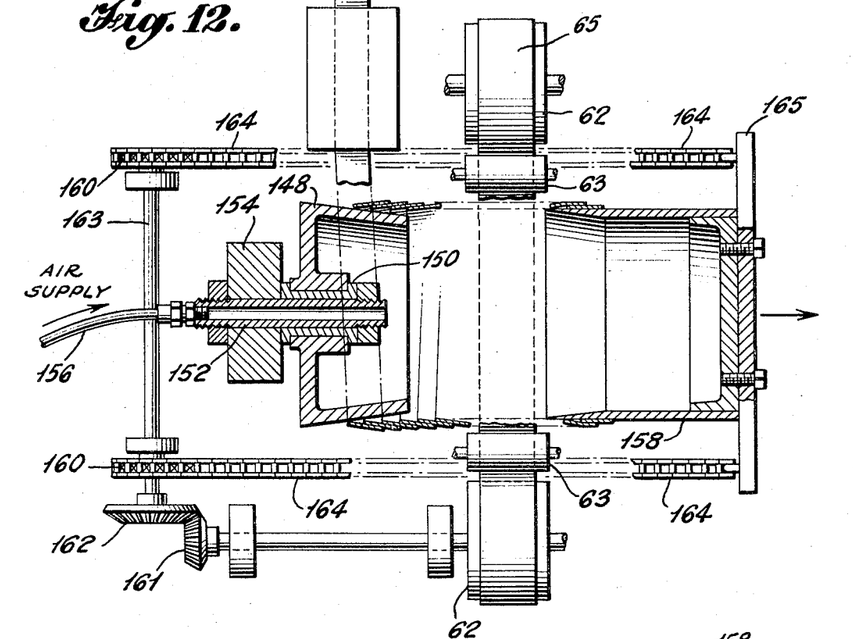
FIG. 12 is a plan sectional view illustrating modified apparatus for moving the completed portion of the cylindrical member in an axial direction off the mandrel by utilizing air pressure.
Figure 13:
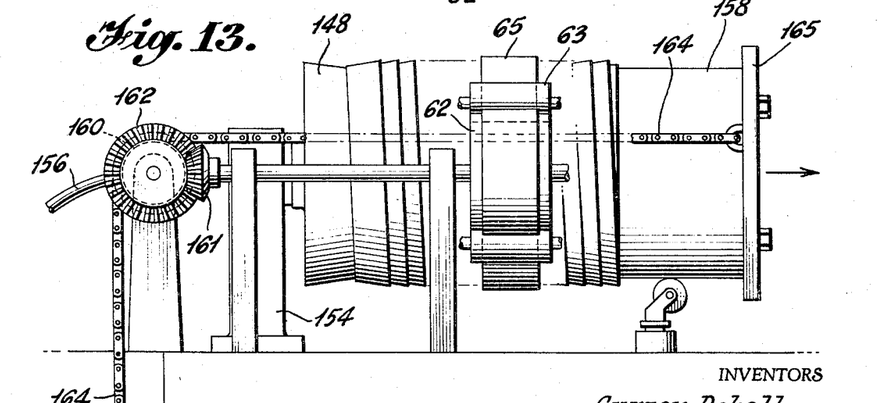
FIG. 13 is a view similar to FIG. 12 showing the apparatus in side elevation.

Referring to the embodiment of the invention shown in FIGS. 12 and 13, a modification of the invention is provided wherein the use of a fluid pressure such as air and the like is provided for withdrawing the completed portion of the cylindrical member axially from the forming head.

In this embodiment of the invention a conical forming head 148 is provided that is free to rotate on a sleeve bearing 150 disposed on a hollow shaft 152. Shaft 152 is secured to a fixed cylindrical bearing member 154. An air supply hose or tube 156 is provided for supply air under pressure to the interior of the conical head 148 through hollow shaft 152. A cylindrical false skirt 158 is initially disposed on the forming head 148 and mates therewith so as to form an air tight relationship therewith. The leading portion of the continuous metal ribbon has a plurality of individual turns formed on and secured to the false skirt 158, and the friction belt drive means 65 similar to that in FIG. 5 causes the skirt and the turns of the cylindrical member to rotate. The air tight relationship is maintained within the formed portion of the cylindrical member since successive turns of the ribbon are bonded and secured together on the head 148 before they are moved axially therefrom. A pinion drive 160 can be synchronized with the friction belt drive 65, by providing a suitable bevel drive 161, 162 connecting the belt drive pulley with the pinion drive shaft 163. Chains 164 carried on pinion drives 160 and extending parallel to the longitudinal axis of the head 148, controls the rate of growth of the cylinder. Chains 164 are single stranded and hang down past the pinion so only a few teeth engage the pinions. The other ends of the chains are secured to a plate 165 secured by screws to head 158. The chains are therefore free to lengthen as the pinions move.

Figure 14:
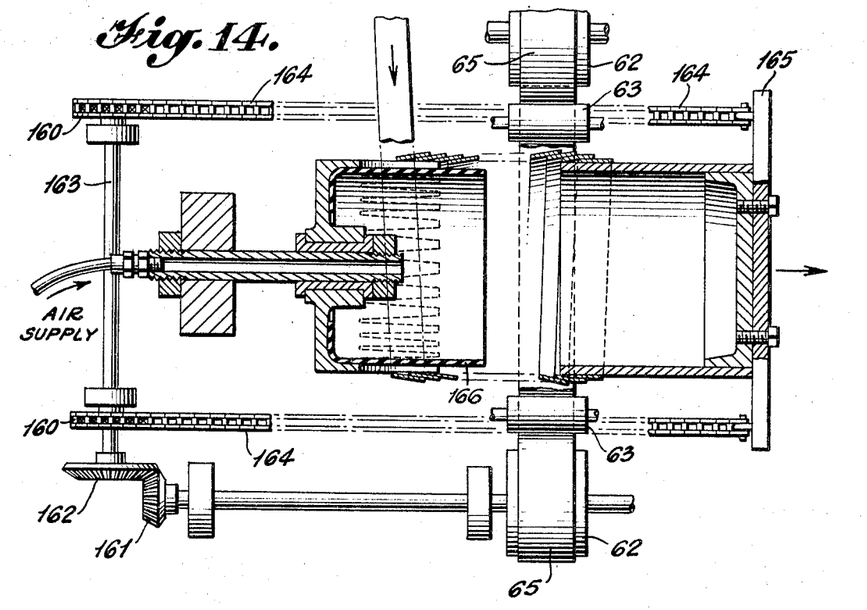
FIG. 14 is a plan view of a modified embodiment of the invention shown in FIG. 12 also, utilizing air pressure.

The embodiment of the invention shown in FIG. 14 is substantially the same as that of FIG. 13 except that cylindrical forming head 166 is provided with a plurality of axially extending V-slots, and a cup-shaped cylindrical sealing member 170 is disposed within the forming head 166 to close off the opening formed by the V-slots. The sealing member 170 is made of an elastomeric material freely rotating with the forming head 166.

Figure 15:
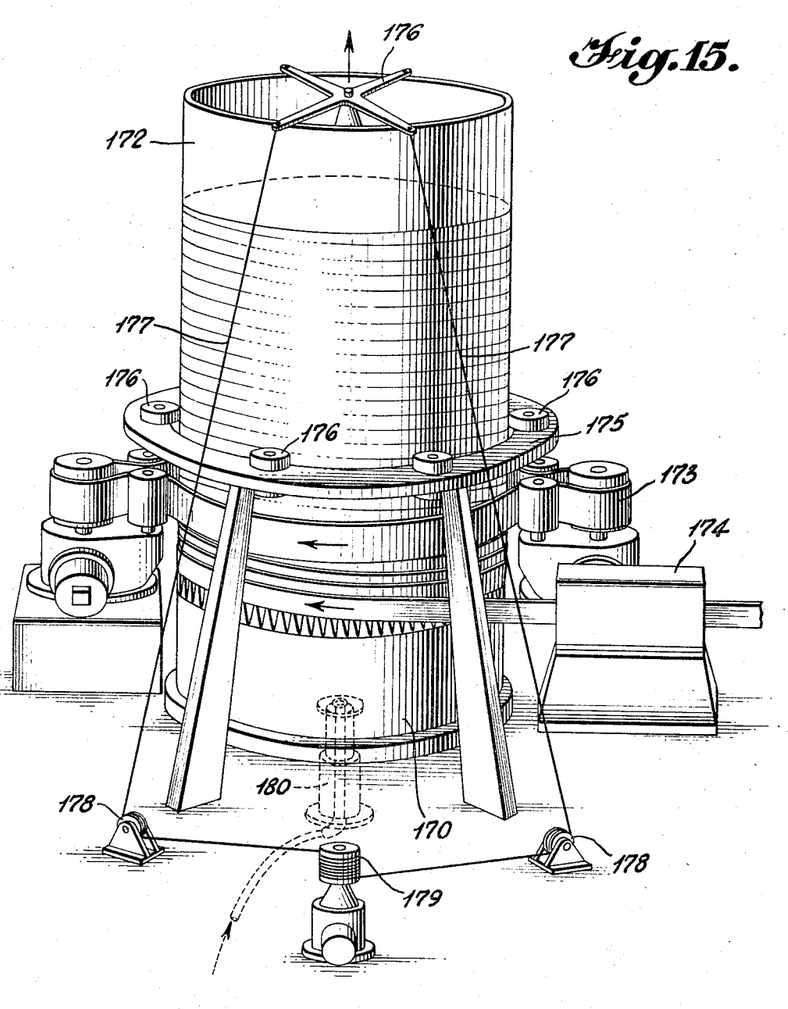
FIG. 15 illustrates apparatus for forming the elongated cylindrical member in a vertical axial direction.

In the embodiment shown in FIG. 15, the cylindrical member is fabricated from the continuous strip of ribbon with end closures formed thereon in a single operation or a continuous production operation, with the cylindrical member being formed or growing in a vertical direction on the site where the vessel is to be used for example, at a rocket launching site.

In this embodiment of the invention an end closure forming head 170 and an end closure forming head 172 are provided, and the metal ribbon 36 after passing through a prestressing and tensioning device 174 is formed on the head 172, and then the head 170 as described in connection with FIG. 11. The cylindrical member and the heads 170 and 172 are rotated by a friction drive belt means 173 similar to that described in FIG. 5. The growing vertical cylinder is supported by a ring structure 175 with spaced rollers 176. The growing cylindrical member is also supported by a free-wheeling spider 176 which rotates in a bearing at the center of the upper end closure 172. Cables 177 connected to pulleys 178 and a winch 179 steady and control the rate of growth of the vessel. The cables prevent the spider 176 from rotating so that only the end closures and the growing cylindrical vessel rotate. Air pressure is supplied to a vessel 180 to support the weight of the growing vessel. The prestressing device remains in a stationary position. The whole operation can be reversed with all of the mechanism rotating around the growing non-rotating product vessel.

Figure 16:
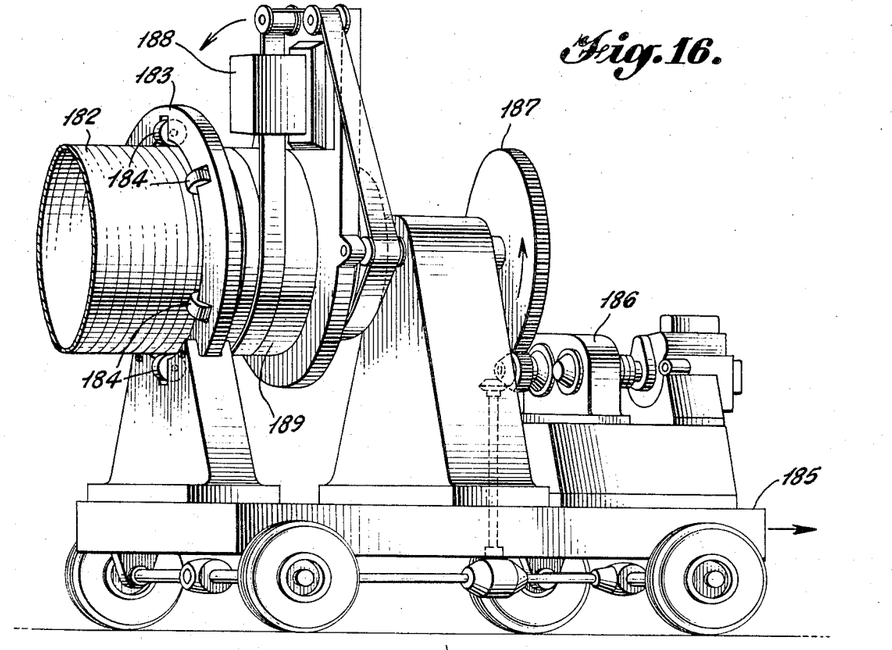
FIG. 16 illustrates apparatus for forming a continuous conduit on the site where it is to be located wherein the production machinery advances along the ground surface where the conduit is to be laid.

In the embodiment of the invention shown in FIG. 16 the apparatus for forming a continuous production of pipe to be laid on the ground or in a trench or the like is provided. The formed pipe 182 remains stationary and is supported as it is formed by a stationary roller ring 183 having spaced rollers 184 revolving on an axis at right angles to the center line of the pipe so that the rollers rotate when the vehicle 185 moves axially. A drive mechanism 186 is provided on the vehicle for driving a gear wheel 187 which rotates the tensioning and prestressing device 188. The device 188 rotates around the forming head 189 which head is stationary. The initial windings will take place on the non-rotating head 189 which will be fitted with some antitorque device to prevent rotation of the pipe. The pipe 182 is fed out of the device by moving the vehicle 185 axially. The vehicle may be self-propelled or it may be pulled along by an independent and separate mechanism.

Figures 17, 19:
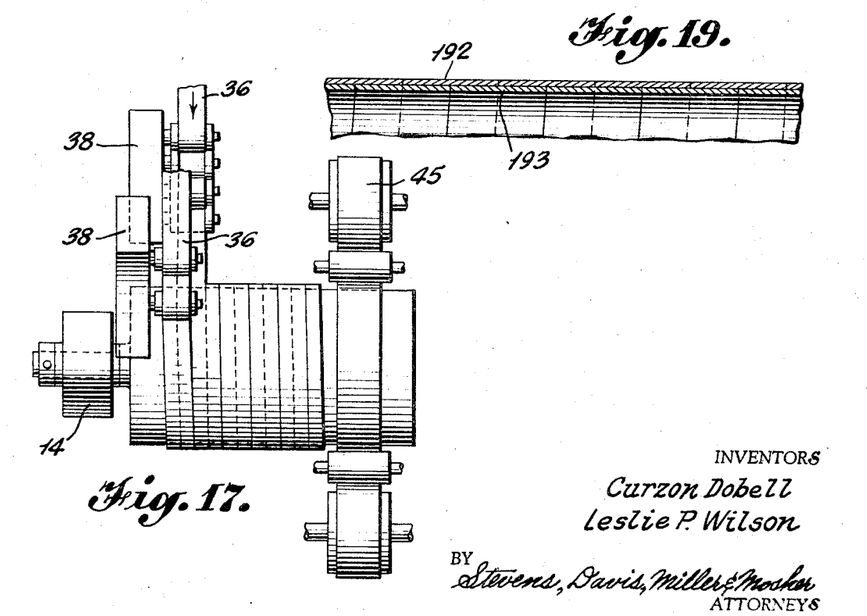
FIGS. 17 and 18 are end and side views respectively illustrating the forming of a reinforced cylindrical member wherein a helically wound strip is bonded to an inner helically wound strip over which it is positioned, both strips being formed simultaneously.
FIG. 19 is a fragmentary detail view illustrating the double layer cylindrical member made by the apparatus of FIG. 17.
Figure 18:
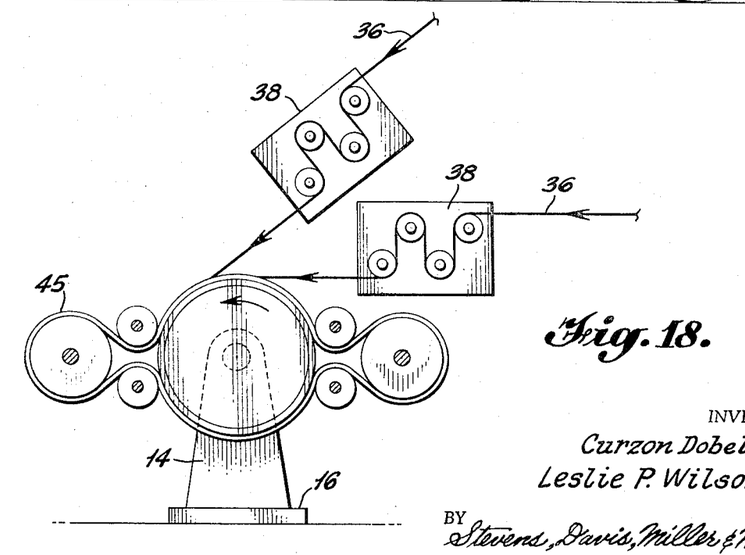

The embodiment of the invention shown in FIGS. 17–19 illustrates winding several layers of ribbon from pretensioning devices as described in connection with FIG. 2. The belt drive 45 is also similar to that described in FIG. 2, or if desired, successive turns of the ribbon may be secured to each other in an overlapping fashion.

Inasmuch as various changes may be made in the form, location and relative arrangement of the several parts and in the method of making the invention, without departing from the essential characteristics of the invention, it will be understood that the invention is not to be limited except by the scope of the appended claims.

What is claimed is:

1. An apparatus for forming a hollow member from a length of high strength material comprising a rotatable forming head with a detachable skirt member for winding turns of material thereon, means for feeding material at an acute angle to said forming head, means mounted adjacent to said forming head for continuously bonding adjacent turns to each other, and means for sequentially frictionally engaging said skirt member and said hollow member to rotate said head and skirt member and for sequentially moving said skirt member and hollow member axially off said head to advance bonded turns of material from said head.

2. An apparatus for forming a hollow member from a length of material comprising a rotatable forming head with a detachable skirt member for winding turns of material thereon, means for feeding material at an acute angle to said forming head, means mounted adjacent said forming head for continuously bonding adjacent turns to each other, and means including a twisted endless belt friction drive for rotating said head and skirt member and for sequentially moving said skirt member and hollow member axially off said head to advance bonded turns of material from said head.

3. An apparatus as defined in claim 2, including means for providing limited axial movement for said forming head.

4. An apparatus as defined in claim 3, wherein said forming head is tapered inwardly for facilitating the removal of bonded turns of material therefrom.

5. An apparatus as defined in claim 2, including means for supporting said hollow member.

6. An apparatus as defined in claim 2, wherein said forming head includes a plurality of circumferentially spaced axial slots with axial conveyor means carried therein for facilitating the removal of bonded turns of material therefrom.

7. An apparatus as defined in claim 1, wherein said conveyor means include pairs of roller member carrying endless belts.

8. An apparatus as defined in claim 1, including means for supporting said hollow member.

9. An apparatus as defined in claim 2, wherein said forming head and said skirt member each includes detachably mounted end members onto which said material is bonded, said end members providing closures for the hollow member formed.

10. An apparatus as defined in claim 2, wherein said means for feeding material at an acute angle to said forming head includes means for feeding separate lengths of material to said forming head simultaneously.

11. A method of forming a hollow elongated member of any desired length comprising, feeding and helically winding a length of material on a freely rotatable forming head and bonding successive turns of the material to each other, winding the initial turns of said material on a skirt member detachably mounted on said forming head, frictionally engaging said skirt member to rotate it and said forming head and axially move them whereby after winding the initial turns of said material about said skirt member remaining turns are formed about said forming head, stopping the axial movement of said forming head thereby progressively removing the elongated member being formed from the forming head, and transferring the frictional engagement for rotating and axially moving said skirt member from said skirt member to the elongated member being formed.

12. A method as defined in claim 11, including feeding and helically winding two lengths of material on a forming head and bonding successive turns of the material together simultaneously.

13. The method of claim 11 including securing the turns of material together in a butt-joint relationship.

14. The method of claim 11 including securing the individual turns of material to each other in an overlapping relationship.

15. The apparatus of claim 2 wherein said head is provided with a plurality of V-slots circumferentially disposed thereon.

16. An apparatus for forming a hollow member from a length of high strength material comprising a rotatable forming head with a detachable skirt member for winding turns of material thereon, means for bonding adjacent wound turns to each other, an endless belt drive for rotating said head and skirt member, and a vehicle for moving said skirt member axially of said head to advance bonded turns of material from said head.

17. An apparatus for forming a hollow member from a length of high strength material comprising a hollow forming head, a rotatable wrapping device for winding turns of material on said forming head, means for rotating said rotatable wrapping device, means for bonding adjacent wound turns to each other, and a vehicle for moving said head member axially away from said hollow elongated member to advance bonded turns of material off said head at a rate corresponding to the rate at which the turns of material are formed on said head.

18. A method of forming a hollow elongated member of any desired length comprising, winding turns of material on a forming head by rotating a rotatable wrapping device, bonding successive turns of the material to each other, and moving said head axially away from said hollow elongated member to advance bonded turns of material from said head at a rate corresponding to the rate at which the turns of material are formed on said head.

19. An apparatus for forming a hollow member from a length of high strength material comprising, a rotatable forming head for winding turns of material thereon; means for feeding material at an acute angle to said forming head; means mounted adjacent to said forming head for continuously bonding adjacent turns of material to each other; and means for sequentially frictionally engaging said forming head and said hollow member formed thereon to rotate said head and said hollow member, and sequentially move said forming head axially, and move said hollow member axially off said head to advance bonded turns of the material from said head.

20. An apparatus for forming a hollow member from a length of material comprising, a rotatable forming head for winding turns of material thereon, means for feeding material at an acute angle to said forming head, means mounted adjacent to said forming head for continuously bonding adjacent turns to each other, and means including a twisted endless belt friction drive for rotating said head and hollow member formed thereon and for sequentially axially moving said forming head and moving said hollow member formed thereon axially off said head to advance bonded turns of material from said head.

21. An apparatus as defined in claim 20, including means for limiting the axial movement of said forming head.

22. An apparatus as defined in claim 21, wherein said forming head is tapered inwardly for facilitating the removal of bonded turns of material therefrom.

23. An apparatus as defined in claim 20, including means for supporting said hollow member.

24. An apparatus as defined in claim 20, wherein said forming head includes a plurality of circumferentially spaced axial slots with axial conveyor means carried therein for facilitating the removal of bonded turns of material therefrom.

25. An apparatus as defined in claim 24, wherein said conveyor means include pairs of roller members carrying endless belts.

26. An apparatus as defined in claim 20, wherein said means for feeding material at an acute angle to said forming head includes means for feeding separate lengths of material to said forming head simultaneously.

27. A method of forming a hollow elongated member of any desired length comprising, feeding and helically winding a length of material on a freely rotatable forming head and bonding successive turns of the material to each other, sequentially frictionally engaging said forming head and said hollow member formed thereon to rotate them and move them axially, and stopping the axial movement of said forming head thereby progressively removing the elongated member being formed while continuing the axial movement of said hollow member thereby progressively removing the bonded windings from said forming head.

28. A method as defined in claim 27, including feeding and helically winding two lengths of material on a forming head and bonding successive turns of the material together simultaneously.

29. The method as defined in claim 27 including securing the turns of materials together in a butt-joint relationship.

30. The method of claim 27 including securing the individual turns of material to each other in an overlapping relationship.

References Cited

UNITED STATES PATENTS

| | | | |
|---|---|---|---|
| 1,018,291 | 2/1912 | Beadle | 219—62 |
| 1,939,581 | 12/1933 | Tesmer | 228—15 |
| 3,038,832 | 6/1962 | Carlson et al. | 93—80 |
| 3,046,382 | 7/1962 | Morris | 219—62 |
| 3,173,594 | 3/1965 | Napier et al. | 228—17 |
| 3,178,550 | 4/1965 | Eggert | 219—62 |
| 3,230,123 | 1/1966 | Christensen | 93—80 |
| 3,253,520 | 5/1966 | Cvacho | 93—80 |

JOHN F. CAMPBELL, *Primary Examiner.*

J. L. CLINE, *Assistant Examiner.*

U.S. Cl. X.R.

228—15, 17; 29—477.7